(12) United States Patent
Lipa

(10) Patent No.: US 12,116,914 B2
(45) Date of Patent: Oct. 15, 2024

(54) METHOD AND DEVICE FOR DIAGNOSING COKING IN A SECONDARY AIR SYSTEM OF AN INTERNAL COMBUSTION ENGINE

(71) Applicant: Vitesco Technologies GmbH, Regensburg (DE)

(72) Inventor: Jaroslav Lipa, Regensburg (DE)

(73) Assignee: Vitesco Technologies GmbH, Regensburg (DE)

( * ) Notice: Subject to any disclaimer, the term of this patent is extended or adjusted under 35 U.S.C. 154(b) by 270 days.

(21) Appl. No.: 17/804,694

(22) Filed: May 31, 2022

(65) Prior Publication Data
US 2022/0290603 A1    Sep. 15, 2022

Related U.S. Application Data

(63) Continuation of application No. PCT/EP2020/081451, filed on Nov. 9, 2020.

(30) Foreign Application Priority Data

Dec. 2, 2019  (DE) .......................... 10 2019 218 709

(51) Int. Cl.
*F01N 11/00*    (2006.01)
*F01N 3/32*    (2006.01)

(52) U.S. Cl.
CPC ................ *F01N 11/00* (2013.01); *F01N 3/32* (2013.01); *F01N 2900/04* (2013.01); *F01N 2900/1804* (2013.01)

(58) Field of Classification Search
CPC ................ F01N 11/00; F01N 2900/04; F01N 2900/1804; F01N 2560/08;
(Continued)

(56) References Cited

U.S. PATENT DOCUMENTS 10,190,462 B2   1/2019 Lipa
2003/0061805 A1*  4/2003 Hirooka .................... F01N 3/22
                                                                  60/277
(Continued)

FOREIGN PATENT DOCUMENTS

CN        106414936 A     2/2017
DE        10344910 A1     5/2004
(Continued)

OTHER PUBLICATIONS

Chinese Office Action dated Nov. 27, 2023 for corresponding Chinese Application No. 202080083718.5.
(Continued)

*Primary Examiner* — Francis C Gray

(57) ABSTRACT

The disclosure relates to a method and a device for diagnosing coking of a secondary air system of an internal combustion engine. The secondary air system has an intake air line for providing secondary air, a secondary air pump for compressing the secondary air, a secondary air valve for controlling the secondary air injection, a pressure sensor that is arranged in the secondary air system downstream of the secondary air pump and upstream of the secondary air valve, and an injection line for injecting the secondary air into an exhaust tract of the internal combustion engine.

8 Claims, 3 Drawing Sheets

(58) Field of Classification Search
CPC ..... F01N 2900/0404; F01N 2900/1406; F01N 3/00; F01N 3/20; F01N 3/222; F01N 3/225; F01N 11/002; F01N 3/30; F01N 3/22; Y02T 10/40
See application file for complete search history.

(56) References Cited

U.S. PATENT DOCUMENTS

| | | | |
|---|---|---|---|
| 2004/0074453 A1 | 4/2004 | Roelle | |
| 2008/0016954 A1* | 1/2008 | Heinrich | F01N 3/32 73/116.02 |
| 2008/0202223 A1* | 8/2008 | Tsujimura | F01N 11/00 73/114.31 |
| 2010/0222981 A1* | 9/2010 | Hacker | F01N 3/225 701/102 |
| 2011/0047972 A1* | 3/2011 | Bauer | B01D 53/9409 60/287 |
| 2014/0366857 A1* | 12/2014 | Kawamura | F01N 11/00 123/585 |
| 2016/0194998 A1* | 7/2016 | Weddig | F01N 9/00 60/284 |
| 2017/0145888 A1 | 5/2017 | Lipa | |

FOREIGN PATENT DOCUMENTS

| | | |
|---|---|---|
| DE | 102006021964 A1 | 11/2007 |
| DE | 102014210884 A1 | 12/2015 |
| DE | 10201410884 B4 | 5/2016 |
| DE | 102018100540 A1 | 7/2019 |
| JP | H09125945 A | 5/1997 |
| JP | 2003314263 A | 11/2003 |
| JP | 2015001194 A | 1/2015 |
| KR | 101871126 B1 | 7/2018 |

OTHER PUBLICATIONS

International Search Report and Written Opinion dated Dec. 17, 2020 from corresponding International Patent Application No. PCT/EP2020/081451.
German Office Action dated Jul. 31, 2020 for corresponding German Patent Application No. 10 2019 218 709.9.

* cited by examiner

METHOD AND DEVICE FOR DIAGNOSING COKING IN A SECONDARY AIR SYSTEM OF AN INTERNAL COMBUSTION ENGINE

CROSS-REFERENCE TO RELATED APPLICATIONS

This application claims the benefit of PCT Application PCT/EP2020/081451, filed Nov. 9, 2020, which claims priority to German Application 10 2019 218 709.9, filed Dec. 2, 2019. The disclosures of the above applications are incorporated herein by reference.

TECHNICAL FIELD

The disclosure relates to a method and a device for diagnosing coking of a secondary air system of an internal combustion engine.

BACKGROUND

During the operation of the internal combustion engine, a secondary air system is activated, in particular after a cold start of the internal combustion engine, in order to achieve rapid heating of an exhaust-gas catalytic converter situated in an exhaust tract of the internal combustion engine to its operating temperature, such that, after the cold start, the emissions of the exhaust-gas constituents HC and CO in particular are reduced.

Undesired pollutant emissions of the internal combustion engine, for example of an Otto-cycle internal combustion engine, can, in a known manner be reduced by catalytic aftertreatment in the exhaust-gas catalytic converter. However, in order to be able to perform the catalytic aftertreatment effectively, the exhaust-gas catalytic converter must have reached a specific operating temperature. Exhaust-gas tests have shown that a major proportion of the pollutant emissions are emitted in the warm-up phase or immediately after the cold start of the internal combustion engine. Therefore, in order to reduce the pollutant emissions, it must be ensured that the exhaust-gas catalytic converter heats up to its operating temperature of 500° C., for example, as rapidly as possible.

Accelerated heating of the exhaust-gas catalytic converter can be achieved by injecting or supplying so-called secondary air into the exhaust tract of the internal combustion engine. The location at which secondary air is fed into the exhaust tract is conventionally situated downstream in the vicinity of exhaust valves of the internal combustion engine and upstream of the exhaust-gas catalytic converter.

A corresponding system for injecting secondary air, a secondary air system, has an electric secondary air pump for pumping secondary air and has a downstream secondary air valve for controlling the secondary air flow. Only when the secondary air valve is at least partially open can secondary air be fed to the exhaust tract.

The heating of the exhaust-gas catalytic converter by secondary air is based on a strongly exothermic reaction of the oxygen-rich secondary air with unburned fuel in the hot exhaust gas of the internal combustion engine. The further oxidation of the unburned fuel upstream of and in the exhaust-gas catalytic converter causes the accelerated heating of the exhaust-gas catalytic converter to the operating temperature. In this way, the pollutant emissions in the warm-up phase of the internal combustion engine are reduced, and the suitable operating temperature of the exhaust-gas catalytic converter is reached more rapidly.

Due to legislative requirements, the secondary air system must be monitored in respect of the pump always being able, as required, to generate a certain minimum air mass flow that can be injected into the exhaust tract by the secondary air valve. The legislator therefore stipulates that the secondary air system must be monitored with respect to its performance. Various influences such as oil consumption, driving style, injection system (intake pipe injection, direct injection) or fuel can lead to coking of the engine and also to coking of the secondary air channels in the internal combustion engine. The coking of the secondary air channels is promoted by the positioning of the secondary air channel outlets directly downstream of the exhaust valves of the internal combustion engine in the exhaust tract. The coking of the secondary air channels leads to a reduction in the cross section of the secondary air channels, as a result of which less secondary air can be injected into the exhaust tract, as a result of which the required emissions values can no longer be adhered to.

SUMMARY

The disclosure provides a method and a device with which diagnosis of coking of a secondary air system of an internal combustion engine is performed in a simple and reliable manner.

One aspect of the disclosure provides a method for diagnosing coking of a secondary air system of an internal combustion engine. The secondary air system has an intake air line, a secondary air pump, a secondary air valve, a pressure sensor and an injection line. The intake air line delivers secondary air, where the secondary air is branched off, for example, from the fresh-air supply of the internal combustion engine. The secondary air pump serves for compressing and conveying the secondary air that is provided via the intake air line. The secondary air valve controls, that is to say prevents or allows, the admission of secondary air. The pressure sensor of the secondary air system is arranged downstream of the secondary air pump and upstream of the secondary air valve in the flow direction of the secondary air. The injection line serves to inject the air compressed by the secondary air pump into the exhaust tract of the internal combustion engine. The method includes operating the internal combustion engine and activating the secondary air pump, where secondary air that is situated between the secondary air pump and the secondary air valve is pressurized or conveyed by the secondary air pump into the secondary air system. The secondary air valve is in this case initially closed, such that no secondary air is injected from the secondary air system along the injection line into the exhaust tract. The pressure of the secondary air increases continuously during the operation of the secondary air pump. The method includes subsequently opening the secondary air valve, whereby secondary air is injected into the exhaust tract of the internal combustion engine. The method includes detecting a pressure profile by the pressure sensor. The pressure profile is characteristic of the pressure of the secondary air that is arranged between the secondary air pump and the secondary air valve, or flows past, during the operation of the internal combustion engine. Accordingly, the method also includes detecting a pressure profile during the pressurization of the secondary air when the secondary air valve is closed, and detecting the pressure profile during and after the opening of the secondary air valve.

The method also includes subsequently determining a maximum pressure value from the pressure profile detected by the pressure sensor. The maximum pressure value is that pressure value which is characteristic of the highest pressure of the secondary air during or within the detected pressure profile.

The method also includes subsequently determining a mean pressure value from the detected pressure profile. The mean pressure value is, for example, the arithmetic mean value of the pressure profile over a specific period of time. The method also includes subsequently comparing the maximum pressure value with the mean pressure value. Based on the comparison, the method included identifying that the secondary air system is coked if the result of the comparison of the maximum pressure value with the mean pressure value exceeds a predetermined threshold value. The predetermined threshold value may also be a limit band, where the method includes identifying that the secondary air system is coked if the result of the comparison departs from the limit band. The predetermined threshold value may be stored in a memory of a control unit. The diagnosis of coking may be performed on an ongoing basis or at predetermined intervals.

The maximum pressure value is, for example, the pressure value immediately before the opening of the secondary air valve. Accordingly, the maximum pressure value is independent of the degree of coking of the injection line. However, if the injection line for the secondary air into the exhaust tract of the internal combustion engine is coked, which reduces the effective cross section of the injection line through which secondary air can flow into the exhaust tract, the detected mean pressure value can change. Accordingly, the mean pressure value is dependent on the effective cross section of the injection line or on the degree of coking of the injection line. The comparison of the relatively constant maximum pressure value, which is independent of the degree of coking, with the mean pressure value, which is dependent on the degree of coking of the injection line, is accordingly a simple and at the same time reliable comparison for identifying whether the secondary air system is coked. Furthermore, the components used in the present method are conventional components of a secondary air system that already exist or are already installed in a secondary air system or in an internal combustion engine having a secondary air system. Accordingly, a diagnosis of coking of the secondary air system is performed easily, rapidly, and independently of additional components.

In some implementations, the detected pressure from the pressure profile immediately before the opening of the secondary air valve is classified as maximum pressure value and is used for the comparison of the maximum pressure value with the mean pressure value. Therefore, it may be conceivable that, immediately before the secondary air valve is actuated to open and accordingly to inject the secondary air into the exhaust tract, the pressure detected immediately beforehand from the pressure profile is classified as maximum pressure value. In some examples, the maximum pressure value is always the detected pressure from the pressure profile that prevails immediately before the opening of the secondary air valve. It is accordingly possible to prevent a possibly detected pressure that is higher than the detected pressure before the opening of the secondary air valve from being used as maximum pressure value for the comparison of the maximum pressure value with the mean pressure value. As described, the method for diagnosis of coking is additionally more reliable and more accurate over a long-term period.

In some implementations, the mean pressure value is determined within a specific time interval of the pressure profile, where the time interval begins upon the opening of the secondary air valve. In this case, the mean pressure value is calculated only from pressure values of the pressure profile that are detected by the pressure sensor after the opening of the secondary air valve. Therefore, the mean pressure value may be composed only of pressure values or of the pressure profile from the pressure sensor after the opening of the secondary air valve. In some examples, the mean pressure value is accordingly dependent only on detected pressure values that are detected by the pressure sensor during the injection of secondary air from the exhaust tract. The mean pressure value may be determined only from the pressure profile detected by the pressure sensor while secondary air flows through the potentially coked injection line into the exhaust tract. Accordingly, the degree of coking of the injection line directly influences the detected mean pressure value according to this example, such that the method can additionally be used precisely and reliably for the diagnosis of coking of the secondary air system.

In some implementations, the specific time interval is greater than or equal to 25 ms (milliseconds) and less than or equal to 500 ms, for example greater than or equal to 50 ms and less than or equal to 300 ms, where the time interval begins after the opening of the secondary air valve. In some examples, the method can be carried out relatively rapidly. As a result, the method can be carried out very easily during the operation of the internal combustion engine, without the internal combustion engine having to be kept in a specific operating mode for a relatively long period of time in order to carry out the method.

In some implementations, for the determination of the mean pressure value from the pressure profile, the corresponding pressure profile section is subdivided into a plurality of segments. The corresponding pressure profile section is that section of the pressure profile which is used for determining the mean pressure value. For example, the corresponding pressure profile section begins immediately after the opening of the secondary air valve and ends, for example, three or five seconds later. The corresponding pressure profile section may subsequently be subdivided, for example, into a plurality of segments, for example into 10 or 20 segments. In some examples, the respective pressure profile maximum or the respective pressure profile minimum of the respective segments is determined. The pressure profile within a segment is subject to fluctuations, for example due to the opening of the exhaust valves of the internal combustion engine, as a result of which exhaust gas can flow into the exhaust tract. The maximum of the pressure within the respective segment is accordingly the pressure profile maximum, and the minimum of the pressure within the respective segment is accordingly the pressure profile minimum. The pressure profile minima and the pressure profile maxima accordingly form the upper and lower envelope of the pressure profile. In some examples, the arithmetic mean of the pressure profile maxima or of the pressure profile minima is subsequently determined and used for determining the mean pressure value. In some examples, it is possible in a very simple but also at the same time precise manner for the mean pressure value to be determined from the pressure profile and used for the comparison of the mean pressure value with the maximum pressure value for the purposes of identifying whether the secondary air system is coked.

In some implementations, the diagnosis of coking of the secondary air system starts only if the pressure sensor determined by the pressure sensor exceeds a predetermined pressure threshold value. For example, if it is identified that the pressure profile exceeds the predetermined pressure threshold value, the command to carry out the diagnosis of coking of the secondary air system can be transmitted by the control unit to the internal combustion engine and/or to the secondary air system.

In some implementations, the diagnosis of coking of the secondary air system is performed during idling operation of the internal combustion engine and/or after a cold start of the internal combustion engine. The idling operation of the internal combustion engine constitutes relatively constant operation of the internal combustion engine, during which the diagnosis of coking of the secondary air system can be carried out particularly easily and advantageously without changing influences of operating parameters of the internal combustion engine. As already mentioned, the injection of secondary air immediately after a cold start of the internal combustion engine is important in order to bring the exhaust-gas catalytic converter in the exhaust tract of the internal combustion engine to the required operating temperature in order to achieve the desired emissions behavior of the internal combustion engine. It is accordingly advantageous if the diagnosis of coking of the secondary air system is also performed immediately after a cold start of the internal combustion engine to obtain a precise analysis of the secondary air system or of the emissions behavior of the internal combustion engine.

In some implementations, for the comparison of the maximum pressure value with the mean pressure value, the ratio of the mean pressure value to the maximum pressure value is calculated. The ratio thus determined is subsequently compared with the predetermined threshold value to identify whether the secondary air system is coked. Calculating the ratio of the mean pressure value to the maximum pressure value is a relatively simple method, but the method is at the same time a reliable tool to obtain a good comparative value for comparison with the predetermined threshold value, such that, the comparison of the maximum pressure value with the mean pressure value can be performed in a simple and reliable manner.

In some implementations, the injection line introduces the secondary air into the exhaust tract on a cylinder-specific basis. In some examples, the pressure profile that is detected by the pressure sensor is subdivided into pressure profile sections that are assigned to the respective cylinders. Respectively cylinder-specific diagnoses of coking are subsequently performed from the resulting cylinder-specific pressure profile sections. The injection line may have multiple branches, where the ends of the branch immediately downstream of the exhaust valves of the respective cylinders inject secondary air into the exhaust tract on a cylinder-specific basis, immediately downstream of the respective cylinder. It is for example conceivable that the pressure sensor or a plurality of pressure sensors accordingly detect cylinder-specific pressure profile sections, such that a cylinder-specific diagnosis of coking of the respective branches of the injection line can be performed. In some examples, the diagnosis of coking is precise, can accordingly be assigned to the respective cylinders, and accordingly offers a precise prediction or diagnosis of the respective coking states of the branches of the injection line.

Another aspect of the disclosure provides a device for diagnosing coking of a secondary air system of an internal combustion engine. The device includes a control unit that is configured to control a method as described above. The device may be an engine control unit. In some examples, the device is part of the engine control unit or is installed as an additional control unit, such as in a vehicle with the internal combustion engine.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
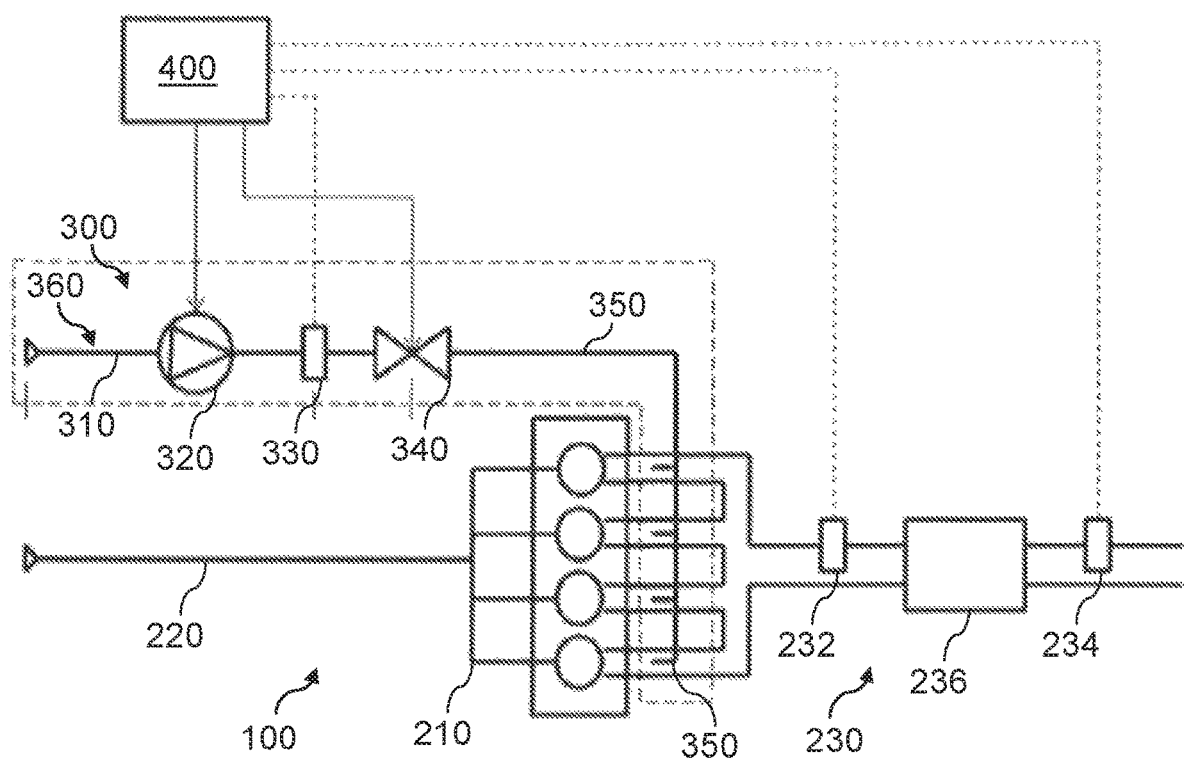
FIG. 1 is a schematic illustration of an internal combustion engine with an exemplary secondary air system.

FIG. 1 shows, in a schematic illustration, an internal combustion engine 100 with an engine block 210, an intake tract 220, an exhaust tract 230, a first lambda probe 232, a second lambda probe 234, and an exhaust-gas catalytic converter 236. As shown, the engine block 210 has four cylinders/combustion chambers. Air is supplied to the engine block 210 by the intake tract 220. Exhaust gas is discharged from the engine block 210 via the exhaust tract 230. The exhaust tract 230 has an exhaust-gas catalytic converter 236 downstream of the engine block 210 for reducing pollutants. The first lambda probe 232 is arranged between the engine block 210 and the exhaust-gas catalytic converter 236 in a flow direction of the exhaust gas and is configured to detect the oxygen content of the exhaust gas downstream of the engine block 210. The second lambda probe 234 is arranged downstream of the exhaust-gas catalytic converter 236 in a flow direction of the exhaust gas and is configured to detect the oxygen content of the exhaust gas downstream of the exhaust-gas catalytic converter 236.

In some implementations, the internal combustion engine 100 has a secondary air system 300. The secondary air system has an intake air line 310, a secondary air pump 320, a pressure sensor 330, a secondary air valve 340 and an injection line 350. The intake air line 310 delivers fresh air to the secondary air system 300. The fresh air or the intake air is, for example, branched off (not illustrated) from the intake tract 220 of the internal combustion engine 100. The secondary air pump 320 of the secondary air system 300 pressurizes and/or conveys secondary air 360. The pressure sensor 330 of the secondary air system 300 is arranged downstream of the secondary air pump 320 in a flow direction of the secondary air 360 and is configured to detect a pressure profile that is characteristic of the pressure of secondary air 360 downstream of secondary air pump 320. The secondary air valve 340 of the secondary air system 300 is arranged downstream of the pressure sensor 330 in a flow direction of the secondary air 360 and is configured to control the injection of secondary air 360 into the exhaust tract 230 of the internal combustion engine 100. The injection line 350 of the secondary air system 300 guides the secondary air 360 into the exhaust tract 230 of the internal combustion engine 100. The injection line 350 may have multiple branches or bifurcations at its ends, such that secondary air 360 is injected into the exhaust tract 230 of the internal combustion engine 100 immediately downstream of exhaust valves of the engine block 210 of the internal combustion engine 100.

FIG. 1 additionally shows a control unit 400 configured to control the secondary air pump 320 and the secondary air valve 340 of the secondary air system 300. In some examples, the pressure sensor 330 of the secondary air system 300 transmits the detected pressure profile of the secondary air 360 to the control unit 400. The first lambda probe 232 and the second lambda probe 234 transmit their detected oxygen profiles to the control unit 400. In some examples, the control unit 400 is additionally configured to carry out or control the method for diagnosing coking according to the present disclosure, and to evaluate the result of said method.

Figure 2:
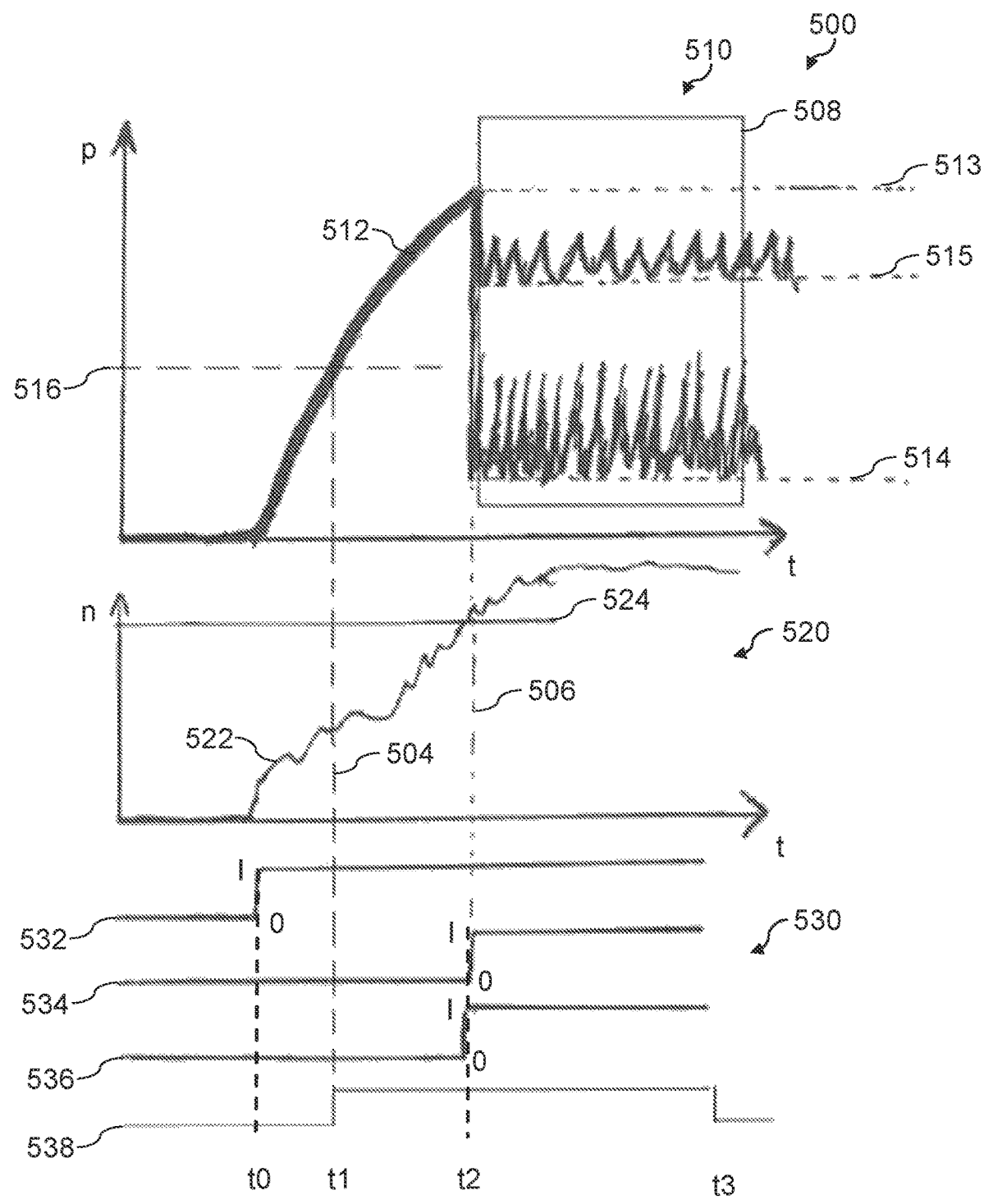
FIG. 2 shows a schematic diagram overview of an exemplary pressure profile and of an exemplary rotational speed profile.

FIG. 2 shows a diagram overview 500 in a schematic illustration. The pressure profile diagram is shown in a first diagram 510. The rotational speed profile diagram is shown in a second diagram 520, and control signals from various components of the internal combustion engine 100 are shown in a third diagram 530. The time t is plotted on the abscissas of the first diagram 510, of the second diagram 520 and of the third diagram 530. The pressure p, detected by the pressure sensor 330 of the secondary air system 300, is plotted on the ordinate of the first diagram 510. The rotational speed n of the internal combustion engine 100 is plotted on the ordinate of the second diagram 520. The first diagram 510 thus represents the pressure profile 512 versus the time t. It can be seen here how the pressure rises to a maximum pressure value 513 by way of the secondary air pump 320. The secondary air valve 340 is subsequently opened, resulting in a pressure drop that can be seen from the first diagram 510. Accordingly, a first mean pressure value 514 and a second mean pressure value 515 are formed in the first diagram 510. The first mean pressure value 514 constitutes the mean pressure value in the case of uncoked injection lines 350. This can be seen in particular from the fact that the first mean pressure value 514 is lower than a second mean pressure value 515. The second mean pressure value 515 accordingly constitutes the mean pressure value in the case of partially coked injection lines 350 of the secondary air system 300. If the injection line or the injection lines 350 of the secondary air system 300 were completely coked and accordingly no secondary air 360 whatsoever could pass into the exhaust tract 230 of the internal combustion engine 100, then the mean pressure value 514, 515 would correspond to the maximum pressure value 513, since no secondary air 360 can flow out of the secondary air system 300 and the pressure in the secondary air system 300 would remain constant, or would even increase further, even when the secondary air valve 340 is open.

As can be seen from the first diagram 510, the first mean pressure value 514 and the second mean pressure value 515 each constitute the lower envelope curve of the measured pressure profile 512 during a corresponding time window 508 immediately after the opening of the secondary air valve 340. In some examples, an upper envelope curve or a simple mean value of the detected pressure profile 512 would also be conceivable.

The second diagram 520 represents the rotational speed profile 522 versus the time t during the execution of the method for detecting coking. The third diagram 530 shows a control signal 532 of the secondary air pump 320, a control signal 534 of the secondary air valve 340, a signal 536 of the starting phase of the internal combustion engine 100, and a signal 538 of the course of the diagnosis. From the control signal 532 of the secondary air pump 320, it can be seen that the secondary air pump 320 is activated simultaneously or immediately after the start-up of the internal combustion engine 100 at a time t0, as a result of which the pressure in the secondary air system 300 increases. It can be seen from the control signal 534 of the secondary air valve 340 that, when the secondary air valve 340 is actuated to open at a time t2, the pressure within the secondary air system 300 falls. In the second diagram 520, a starting rotational speed limit 524 is plotted, which indicates when the rotational speed of the internal combustion engine 100 has exceeded the starting rotational speed limit 524. As shown, in some examples, the secondary air valve 340 is opened immediately after the starting rotational speed limit 524 is exceeded at the time t2. Accordingly, the signal 536 of the starting phase from the third diagram indicates when the internal combustion engine 100 has exceeded the rotational speed that constitutes the starting rotational speed limit 524. Additionally plotted in the first diagram 510 is a pressure threshold value 516 which, in some examples, must be exceeded by the pressure profile 512 at a time t1 so that the method for diagnosing coking can be carried out. It can be seen from the signal 538 of the course of the diagnosis of the third diagram 530 that the diagnosis of coking starts only when the pressure profile 512 has exceeded the pressure threshold value 516, and ends at a time t3.

Figure 3:
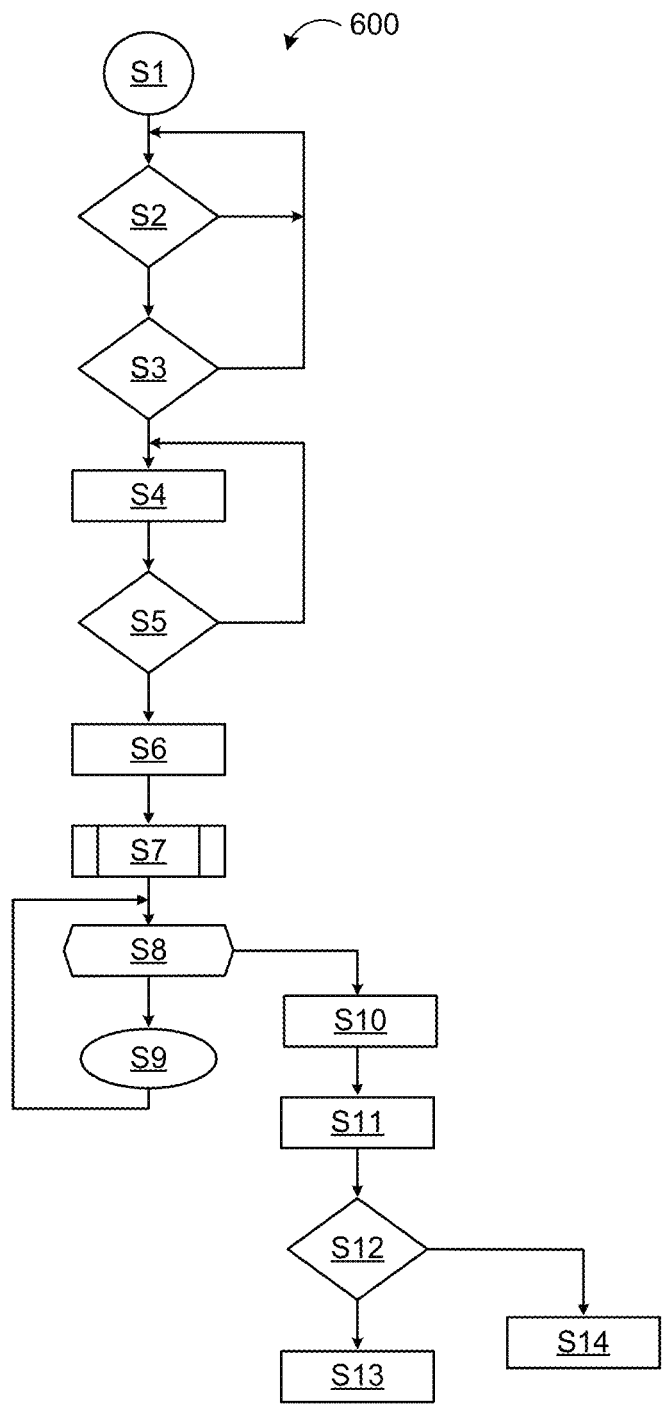
FIG. 3 shows an exemplary block diagram for the execution of a method for diagnosing coking of a secondary air system.

FIG. 3 shows an exemplary flow diagram 600 for the execution of the method for diagnosing coking. The flow diagram 600 begins with a first step S1, which initiates the execution of the method for diagnosing coking. In the subsequent second step S2, a first query is carried out, in which it is checked whether the secondary air pump 320 is running. If yes, the method is continued, and if no, the query is restarted. In a subsequent third step S3, a second query is carried out, in which it is checked whether the pressure threshold value 516 has been reached in the secondary air system 300. If yes, the method is continued, and if no, the query is restarted. In the subsequent fourth step S4, if the third query was positive, the pressure profile 512 is stored, where, for example, the pressure is detected by the pressure sensor 330, and transmitted to the control unit 400 for storage, at equidistant intervals.

Subsequently, in the fifth step S5, a third query is carried out, in which it is checked whether the end of the starting phase of the internal combustion engine 100 has been reached. If yes, the method is continued, and if no, the query is repeated. If the fifth step S5 was positive, the presently prevailing pressure within the secondary air system 300, which is detected by the pressure sensor 330, is immediately subsequently stored in a sixth step S6. This pressure is stored as maximum pressure value 513. Subsequently, in a seventh step S7 immediately after the sixth step S6, the secondary air valve 340 is opened for the purposes of injecting secondary air 360. Subsequently, in an eighth step S8, the pressure profile is detected during the time window 508, and a mean pressure value calculation is performed. The calculation of the mean pressure value may be performed in an optional step S9 by way of minimum pressure buffering. Here, the pressure profile 512 to be used for the calculation of the mean pressure value is subdivided into segments of equal size during the time window 508, wherein the minimum pressure is determined in the respective segments, and the arithmetic mean is calculated from the sum of the minimum pressures and is transmitted as mean pressure value 514, 515 to the control unit 400. In a step S10 following step S8, a ratio of the mean pressure value 514, 515 to the stored maximum pressure value 513 is calculated. In a subsequent step S11, the result of the ratio calculation is stored and is subsequently compared with a predetermined threshold value in a step S12. It is subsequently identified that the secondary air system 300 is coked if the result of the comparison query exceeds the predetermined threshold value, for example. This is illustrated schematically in the flow diagram 600 in FIG. 3 by identification of coking S13 and no identification of coking S14. The predetermined threshold value may for example be stored in the control unit 400.

A number of implementations have been described. Nevertheless, it will be understood that various modifications may be made without departing from the spirit and scope of the disclosure. Accordingly, other implementations are within the scope of the following claims.

What is claimed is:

1. A method for diagnosing coking of a secondary air system of an internal combustion engine, the secondary air system has an intake air line for providing secondary air, a secondary air pump for compressing the secondary air, a secondary air valve for controlling a secondary air injection, a pressure sensor arranged in the secondary air system downstream of the secondary air pump and upstream of the secondary air valve, and an injection line for injecting the secondary air into an exhaust tract of the internal combustion engine, the method comprising:
   operating the internal combustion engine and activating the secondary air pump to pressurize secondary air situated between the secondary air pump and the secondary air valve, the secondary air valve being closed;
   opening the secondary air valve to inject the secondary air into the exhaust tract of the internal combustion engine;
   detecting a pressure profile by the pressure sensor, the pressure profile is characteristic of the pressure of the secondary air between the secondary air pump and the secondary air valve during the operation of the internal combustion engine;
   determining a maximum pressure value from the pressure profile;
   determining a mean pressure value from the pressure profile;
   comparing the maximum pressure value with the mean pressure value; and
   identifying that the secondary air system is coked if a result of the comparison of the maximum pressure value with the mean pressure value exceeds a predetermined threshold value,
   wherein the mean pressure value is determined within a specific time interval of the pressure profile, the time interval begins upon the opening of the secondary air valve, the specific time interval is greater than or equal to 50 milliseconds and less than or equal to 300 milliseconds, beginning after the opening of the secondary air valve.

2. The method of claim 1, wherein the detected pressure from the pressure profile immediately before the opening of the secondary air valve is classified as maximum pressure value and is used for the comparison of the maximum pressure value with the mean pressure value.

3. The method of claim 1, wherein, for the determination of the mean pressure value from the pressure profile, the corresponding pressure profile section is subdivided into a plurality of segments, and the pressure profile maximum or the pressure profile minimum of the respective segment is determined, and the mean pressure value is an arithmetic mean of a pressure profile maxima or of a pressure profile minima.

4. The method of claim 1, wherein the diagnosis of coking of the secondary air system starts if the pressure profile determined by the pressure sensor exceeds a predetermined pressure threshold value.

5. The method of claim 1, wherein the diagnosis of coking of the secondary air system is performed during idling operation of the internal combustion engine and/or after a cold start of the internal combustion engine.

6. The method of claim 1, wherein, for the comparison of the maximum pressure value with the mean pressure value, the method includes:
   calculating a ratio of the mean pressure value to the maximum pressure value, and
   comparing the ratio with the predetermined threshold value.

7. The method of claim 1, wherein the injection line injects the secondary air on a cylinder-specific basis, and the pressure profile of the pressure sensor is subdivided into cylinder-specific pressure profile sections which are assigned to the respective cylinders, wherein a cylinder-specific diagnosis of coking is performed from the resulting cylinder-specific pressure profile sections.

8. A device for diagnosing coking of a secondary air system of an internal combustion engine, wherein the device comprises a control unit that is configured to control a method comprising:
   operating the internal combustion engine and activating a secondary air pump to pressurize secondary air situated between the secondary air pump and a secondary air valve, the secondary air system having an intake air line for providing secondary air, a secondary air pump for compressing the secondary air, the secondary air valve for controlling a secondary air injection, a pressure sensor arranged in the secondary air system downstream of the secondary air pump and upstream of the secondary air valve, and an injection line for injecting the secondary air into an exhaust tract of the internal combustion engine, wherein the secondary air valve is closed;
   opening the secondary air valve to inject the secondary air into the exhaust tract of the internal combustion engine;
   detecting a pressure profile by the pressure sensor, the pressure profile is characteristic of the pressure of the secondary air between the secondary air pump and the secondary air valve during the operation of the internal combustion engine;
   determining a maximum pressure value from the pressure profile;
   determining a mean pressure value from the pressure profile;
   comparing the maximum pressure value with the mean pressure value; and
   identifying that the secondary air system is coked if a result of the comparison of the maximum pressure value with the mean pressure value exceeds a predetermined threshold value,
   wherein the mean pressure value is determined within a specific time interval of the pressure profile, the time interval begins upon the opening of the secondary air valve, the specific time interval is greater than or equal to 50 milliseconds and less than or equal to 300 milliseconds, beginning after the opening of the secondary air valve.

* * * * *